United States Patent
Park

(10) Patent No.: US 9,942,520 B2
(45) Date of Patent: *Apr. 10, 2018

(54) INTERACTIVE AND TARGETED MONITORING SERVICE

(71) Applicant: KT CORPORATION, Gyeonggi-do (KR)

(72) Inventor: Chul-Hyun Park, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 407 days.

This patent is subject to a terminal disclaimer.

(21) Appl. No.: 14/580,700

(22) Filed: Dec. 23, 2014

(65) Prior Publication Data

US 2015/0181171 A1 Jun. 25, 2015

(30) Foreign Application Priority Data

Dec. 24, 2013 (KR) ........................ 10-2013-0163048

(51) Int. Cl.
*H04N 7/18* (2006.01)
*H04L 29/06* (2006.01)
*G06K 9/00* (2006.01)

(52) U.S. Cl.
CPC .................. *H04N 7/18* (2013.01); *G06K 9/00* (2013.01); *H04L 63/08* (2013.01)

(58) Field of Classification Search
CPC ............. H04N 7/18; H04L 63/08; G06K 9/00
USPC ........................................................ 348/143
See application file for complete search history.

(56) References Cited

U.S. PATENT DOCUMENTS

| 6,741,250 | B1 | 5/2004 | Furlan et al. |
| 7,460,148 | B1 | 12/2008 | Clark et al. |
| 7,590,261 | B1 | 9/2009 | Mariano et al. |
| 2003/0053659 | A1 | 3/2003 | Pavlidis et al. |
| 2004/0139470 | A1* | 7/2004 | Treharne ................ G08G 1/127 725/105 |
| 2006/0004486 | A1 | 1/2006 | Yoshikawa et al. |
| 2006/0125919 | A1 | 6/2006 | Camilleri et al. |
| 2006/0152592 | A1 | 7/2006 | Chishima et al. |

(Continued)

FOREIGN PATENT DOCUMENTS

| JP | 2002-183620 A | 6/2002 |
| JP | 2011-232877 A | 11/2011 |

(Continued)

*Primary Examiner* — Hee-Yong Kim
(74) *Attorney, Agent, or Firm* — IP Legal Services, LLC

(57) ABSTRACT

The disclosure is related to an interactive and targeted monitoring service. The interactive and targeted monitoring service may be provided in cooperation of a service server and a control system. The service server may perform: providing a target object recognition signal to the user equipment and the control signal in response to a service request message from the user equipment, requesting the control system to provide the interactive and target monitoring service on a target object recognized based on the target object recognition signal using the plurality of monitoring devices, performing, by the service server, a protection procedure in response to a protection request from at least one of the control system and the user equipment, and requesting, by the service server, the control system to terminate the interactive and targeted monitoring service in response to termination notification from the control system.

19 Claims, 9 Drawing Sheets

(56) References Cited

U.S. PATENT DOCUMENTS

| | | |
|---|---|---|
| 2006/0197839 A1 | 9/2006 | Senior et al. |
| 2006/0291695 A1 | 12/2006 | Lipton et al. |
| 2008/0062255 A1 | 3/2008 | Gal |
| 2008/0129844 A1 | 6/2008 | Cusack et al. |
| 2008/0291278 A1 | 11/2008 | Zhang et al. |
| 2009/0219393 A1 | 9/2009 | Vian et al. |
| 2009/0293110 A1 | 11/2009 | Koga |
| 2010/0225471 A1 | 9/2010 | Kawamoto et al. |
| 2010/0327057 A1 | 12/2010 | Medina et al. |
| 2011/0119716 A1 | 5/2011 | Coleman, Sr. |
| 2011/0193965 A1 | 8/2011 | Kim |
| 2012/0002047 A1 | 1/2012 | An et al. |
| 2012/0046044 A1 | 2/2012 | Jamtgaard et al. |
| 2012/0154522 A1 | 6/2012 | Yoo et al. |
| 2012/0191407 A1 | 7/2012 | Kim et al. |
| 2012/0206275 A1 | 8/2012 | Mauderer |
| 2012/0330453 A1 | 12/2012 | Samak Sangari et al. |
| 2013/0046847 A1 | 2/2013 | Zavesky et al. |
| 2013/0116859 A1 | 5/2013 | Ihlenburg et al. |
| 2013/0265423 A1 | 10/2013 | Bernal et al. |
| 2014/0197232 A1 | 7/2014 | Birkler et al. |
| 2014/0279707 A1 | 9/2014 | Joshua et al. |

FOREIGN PATENT DOCUMENTS

| | | |
|---|---|---|
| KR | 10-2010-0119920 A | 11/2010 |
| KR | 10-2010-0132693 A | 12/2010 |
| KR | 10-1026631 B1 | 4/2011 |
| KR | 10-2011-0060342 A | 6/2011 |
| KR | 10-1038370 B1 | 6/2011 |
| KR | 10-2012-0035353 A | 4/2012 |
| KR | 10-1142933 B1 | 5/2012 |
| KR | 10-2012-0085078 A | 7/2012 |
| KR | 10-2012-0090117 A | 8/2012 |
| KR | 10-2013-0015626 A | 2/2013 |
| KR | 10-1262355 B1 | 5/2013 |
| KR | 10-2013-0072790 A | 7/2013 |

\* cited by examiner

INTERACTIVE AND TARGETED MONITORING SERVICE

CROSS REFERENCE TO PRIOR APPLICATIONS

The present application claims priority under 35 U.S.C. § 119 to Korean Patent Application No. 10-2013-0163048 (filed on Dec. 24, 2013).

The subject matter of this application is related to U.S. patent application Ser. No. 14/454,710, filed on 7 Aug. 2014, and U.S. patent application Ser. No. 14/454,920, filed on 8 August, 2014, the teachings of which are incorporated herein their entirety by reference.

BACKGROUND

The present disclosure relates to interactively monitoring a target object in a predetermined area and, more particularly, to providing an interactive and targeted monitoring service to an individual and reporting an occurrence of an abnormal event or an emergency to relevant organizations.

In general, an urban incident control and management center monitors unspecified individuals or public places using a plurality of monitoring devices, such as surveillance cameras. However, monitoring of the unspecified individuals or the public places is not effective on detecting or preventing an accident or an abnormal event for a specified individual. Furthermore, an individual experiencing an emergency is not able to communicate with the urban incident control and management center, nor the center can identify whether the individual is experiencing the emergency.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present embodiment, an individual may be enabled to designate a target object or a target person to monitor through an authentication procedure.

In accordance with another aspect of the present invention, a service server may enable a target monitoring person to confirm whether the service server monitor In accordance with another aspect of the present invention, an individual may request a service server to monitor himself/herself and be aware of being monitored by the service server.

In accordance with at least one embodiment, a method may be provided for providing an interactive and targeted monitoring service to user equipment by a control system that is coupled with a service server and a plurality of monitoring devices through a communication network. Such a method may include monitoring a target object as the interactive and monitoring service, determining whether an abnormal event occurs in associated with the target object based on the monitoring result, triggering a protection procedure upon the detection of the abnormal event, and informing the service server of termination of the abnormal event.

In accordance with another embodiment, a method may be provided for providing an interactive and targeted monitoring service to user equipment by a control system that is coupled with a service server and a plurality of monitoring devices through a communication network. The method may include monitoring a target object as the interactive and monitoring service, determining whether an abnormal event occurs in associated with the target object based on the monitoring result, triggering a protection procedure upon the detection of the abnormal event, and informing the service server of termination of the abnormal event.

BRIEF DESCRIPTION OF THE DRAWINGS

The above and/or other aspects of the present invention will become apparent and more readily appreciated from the following description of embodiments, taken in conjunction with the accompanying drawings, of which.

DESCRIPTION OF EMBODIMENTS

Figure 1:
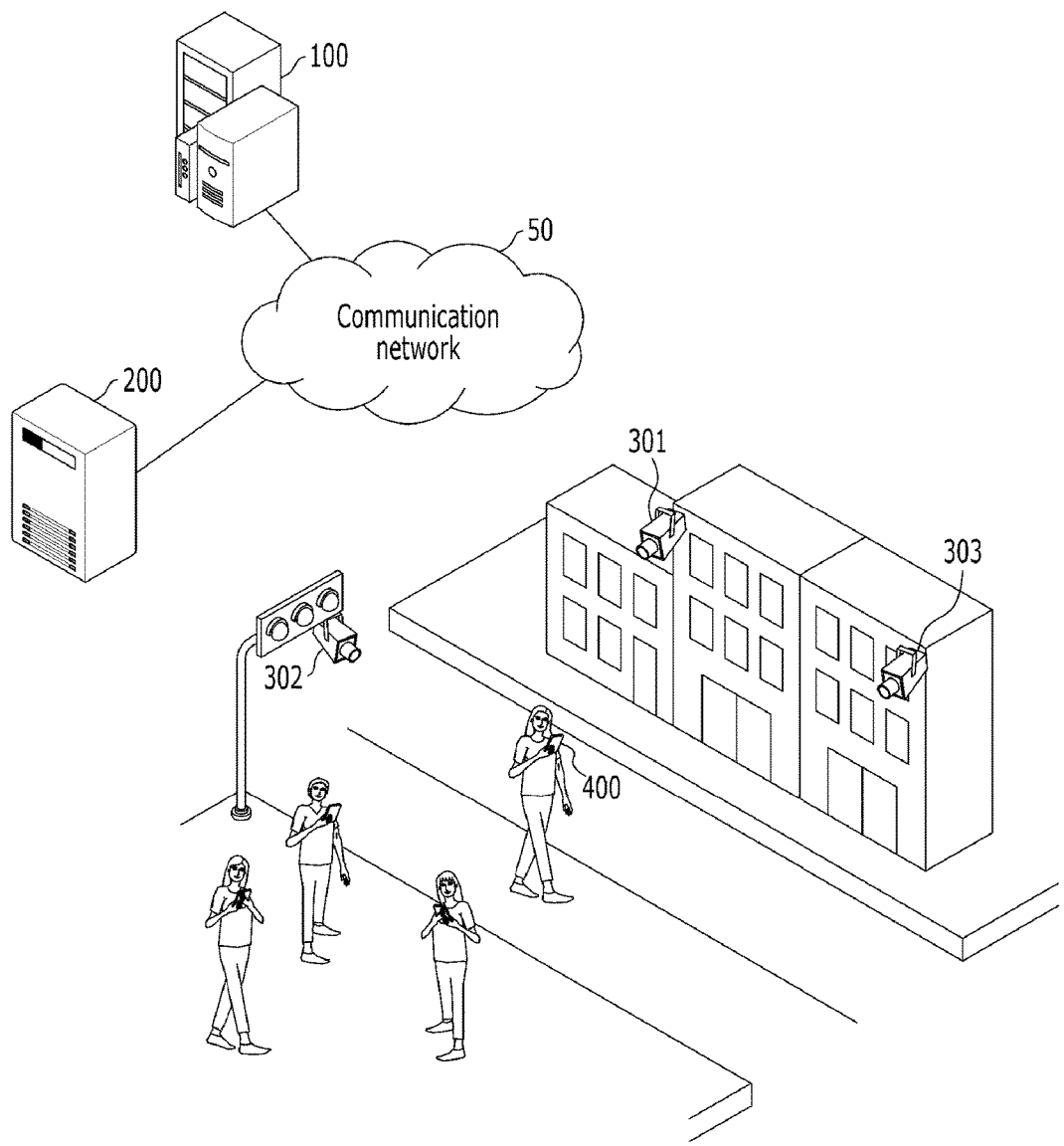
FIG. 1 illustrates a service server for providing an interactive and targeted monitoring service in accordance with at least one embodiment.

Reference will now be made in detail to embodiments of the present invention, examples of which are illustrated in the accompanying drawings, wherein like reference numerals refer to like elements throughout. The embodiments are described below, in order to explain the present invention by referring to the figures.

FIG. 1 illustrates a service server for providing an interactive and targeted monitoring service in accordance with at least one embodiment.

Referring to FIG. 1, service server 100 may provide an interactive and targeted monitoring service upon receiving a service request message from a registered user through user equipment 400. For example, service server 100 receives a message for requesting the interactive and targeted monitoring service from the registered user, determines a target object to monitor based on information included in the received message, and monitors the target object in cooperation with control system 200 and monitoring devices 301 to 303. Such service server 100 may be coupled to control system 200 through communication network 500 and may cooperate with control system 200 to control monitoring devices 301 to 303.

Monitoring devices 301 to 303 may monitor a target object designated by service server 100 and transmit the monitoring result directly to service server 100 or through control system 200. For example, monitoring devices 301 to 303 capture images of a target object (e.g., a registered user) in response to a control signal from control system 200 and transmit the captured images to at least one of control system 200 and service server 100. Monitoring devices 301 to 303 may be surveillance cameras capable of recording images of a target object in a service area, but the present invention is not limited thereto. Monitoring devices 301 to 303 may be an electronic device collecting various types of information on a target object. For example, monitoring devices 301 to 303 may i) record voice and sound generated from or around a target object, ii) measure a temperature, a humidity, a pressure around a target object, or iii) detect motions occurring around a target object.

As described, service server 100 may provide an interactive and targeted monitoring service upon receiving a message for requesting the interactive and targeted monitoring service from a registered user through user equipment 400. In particular, service server 100 i) receives a request message for an interactive and targeted monitoring service from user equipment 400 of a registered user, ii) generates a target object recognition signal, and iii) transmits the generated target object recognition signal to user equipment 400 of the registered user. User equipment 400 receives the target object recognition signal from service server 100 and performs a predetermined operation in response to the target object recognition signal. For example, user equipment 400 may generate a predetermined image pattern based on the target object recognition signal and display the generated image pattern on display 440, control a light mounted on user equipment 400 to emit a predetermined blinking pattern, or guide the registered user to make a predetermined gesture or a predetermined pose. The registered user (e.g., owner of user equipment 400) may present the image pattern displayed on user equipment 400 to monitoring devices 301 to 303, or at least one of monitoring devices 301 to 303 may detect the image pattern displayed on user equipment 400, the blinking pattern emitted from user equipment 400, or the predetermined pose or gesture that the registered user makes. Monitoring devices 301 to 303, in cooperation with control system 200, may recognize such target object recognition signal presented by the registered user and identify the registered user who requests the interactive and targeted monitoring service. The target object recognition signal may include information that controls user equipment 400 to produce at least one of an image pattern, a graphic pattern, a flash light blink pattern, a sound pattern, and so forth.

In accordance with at least one embodiment, control system 200 may detect the target object recognition signal displayed or generated at user equipment 400, initiate the interactive and targeted monitoring service, and transmit a notification message to service server 100. As the interactive and targeted monitoring service, service server 100 may request control system 200 to intensively monitor the recognized target object (e.g., the registered user of user equipment 400) until the interactive and targeted monitoring service is terminated.

Control system 200 may generally monitor unspecified individuals and public places in cooperation with monitoring devices 301 to 303. In particular, control system 200 may provide an interactive and targeted monitoring service on a specified individual in cooperation with service server 100. For example, control system 200 may identify the registered user requesting the interactive and targeted monitoring service, monitor the registered user in cooperation with monitoring devices 301 to 303, collect location data from user equipment 400, and determine whether an abnormal event occurs to or around the registered user based on the monitoring result and the collected location data in accordance with at least one embodiment.

In accordance with at least one embodiment, control system 200 may receive a request message for the interactive and targeted monitoring service from service server 100 through communication network 500. The request message may include information on the target object recognition signal generated by service server 100 and information on the registered user and associated user equipment 400. Control system 200 may identify a target object (e.g., registered user) to monitor by detecting a target object recognition signal generated at user equipment 400 and perform an associated protection procedure.

For convenience and ease of understanding, each of service server 100 and control system 200 were illustrated and described as an independent system for performing a designated operation, but the present invention is not limited thereto. For example, service server 100 may be implemented with control system 200 as a standalone server to perform both functions of service server 100 and control system 200.

User equipment 400 may receive a user input requesting the interactive and targeted monitoring service from the registered user and transmit a request message to service server 100. For example, user equipment 400 receives a user input from the registered user through a predetermined input circuit, such as a touch screen, a designated button, a motion sensor, a microphone, and so forth. In response to such user input, user equipment 400 may execute a predetermined program (e.g., application or App), produce a predetermined graphic user interface as a result of execution, and display the graphic user interface on a display. Such a predetermined program may be downloaded from service server 100 during registration for the interactive and targeted monitoring service, but the present invention is not limited thereto. Through the displayed graphic user interface, user equipment 400 may receive various types of user inputs to request the interactive and targeted monitoring service, to enter information on a destination and a target object, to display a graphic pattern generated based on a target object recognition signal, and to control at least one constituent element based on the target object recognition signal.

User equipment 400 may be an electronic device capable of communicating with other entities coupled to communication network 500, performing operations by processing instructions using digital data stored in a memory, and storing information generated during operation or received other entities. For example, user equipment 400 may include a personal computer, a laptop computer, a mobile terminal, a portable terminal, a smart phone, a pad-like device, and so forth.

Communication network 500 may connect service server 100 with control system 200 and user equipment 400. That is, communication network 500 may be a telecommunication network that enable service server 100 to communicate with control system 200 and user equipment 400. For example, communication network 500 may include a point to point network, a broadcast network, a wide area network, a local area network, a computer network, a telephone network, the Internet, a data communication network, a wireless communication network, a wired communication network, an asynchronous transfer mode (ATM) network, a synchronous optical network (SONET) network, a synchronous digital hierarchy (SDH) network, and so forth.

As described, control system 200 may intensively monitor a target object in response to a request message from service server 100. Hereinafter, such control system 200 will be described in detail with reference to FIG. 2.

Figure 2:
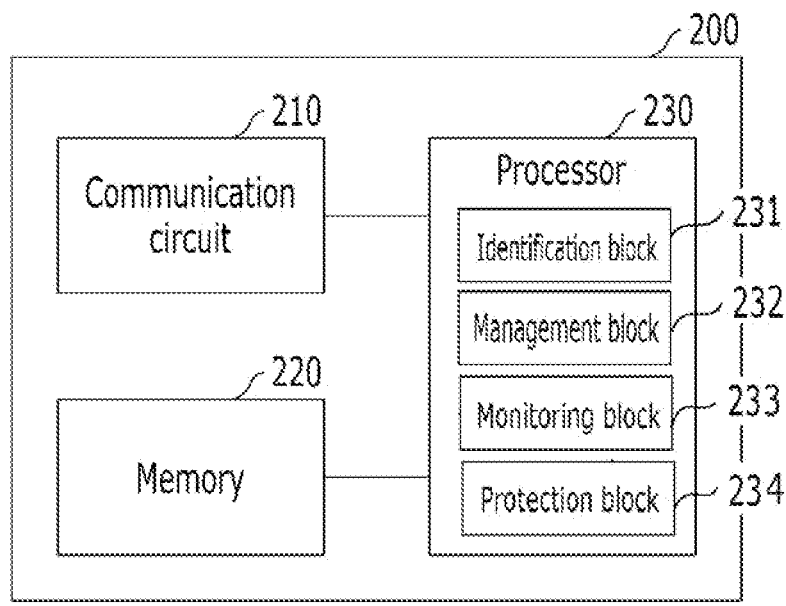
FIG. 2 illustrates a control system for monitoring a target object using a plurality of monitoring devices in accordance with at least one embodiment.

FIG. 2 illustrates a control system for monitoring a target object using a plurality of monitoring devices in accordance with at least one embodiment.

Referring to FIG. 2, control system 200 may be a computer system that controls a plurality of monitoring devices 301 to 303 to monitor a target object. Such control system 200 may include communication circuit 210, processor 230, and memory 220.

Communication circuit 210 may be a circuitry for enabling control system 200 to communicate with other entities through communication network 500 based on various types of communication schemes. For example, communication circuit 210 may be referred to as a transceiver or a transmitter—receiver. In general, communication circuit 210 may transmit data to or receive data from other entities coupled to communication network 500 such as service server 100, monitoring devices 301 to 303, and user equipment 400 through communication network 500. For convenience and ease of understanding, control system 200 is illustrated as having one communication circuit in FIG. 2, but the present invention is not limited thereto. For example, control system 200 may include more than two communication circuits each employing different communication scheme. Communication circuit 210 may include at least one of a mobile communication circuit, a wireless internet circuit, a near field communication (NFC) circuit, a global positioning signal receiving circuit, and so forth. Particularly, communication circuit 210 may include a short distance communication circuit for short distance communication, such as NFC, and a mobile communication circuit for long range communication through a mobile communication network, such as long term evolution (LTE) communication or wireless data communication (e.g., WiFi).

In accordance with at least one embodiment, communication circuit 210 may receive i) a target object recognition signal to be registered an associated user (e.g., user equipment) with the received target object recognition signal, ii) monitoring results from a plurality of monitoring devices 301 to 303, iii) location data of user equipment 400 through service server 100, iv) a request message for removal of registration from service server 100, and v) a request message for providing monitoring results. Communication circuit 210 may transmit i) a notification message for informing various status of the interactive and targeted monitoring service to at least one of user equipment 400 and service server 100, ii) a request message for requesting a protection procedure, and iii) monitoring results.

Memory 220 is a circuitry for storing various types of digital data including an operating system, at least one application, information and data necessary for performing operations associated with the interactive and targeted monitoring service. In accordance with at least one embodiment, memory 220 may store information on a plurality of target object recognition signals registered with associated user equipment, information on registered user including associated user equipment, and monitoring results collected from a plurality of monitoring devices 301 to 303.

Memory 220 may store and manage monitoring results collected from a plurality of monitoring devices 301 to 303, such as images and sound of monitored areas. The monitoring results may be stored for a predetermined period of time and be destroyed after the predetermined period. Memory 220 may store supplementary information associated with the monitoring results, such as a location indicating a place where the images are captured, a time of capturing, an associated monitoring device, and so forth.

Memory 220 may store information on target object recognition signals registered with associated users or user equipment. Upon receipt of a request message from service server 100 for removal of a target object recognition signal associated with a specific user, memory 220 may delete the requested target object recognition signal stored with the characteristic information of the registered user and release the registered user from the target object. Service server 100 may be notified with removing of the target object recognition signal and releasing of the registered user through communication network 500.

Processor 230 may be a central processing unit (CPU) that carries out the instructions of a predetermined program stored in memory 230 by performing basic arithmetic, logical, control and input/output operations specified by the instructions. In accordance with at least one embodiment, processor 230 of control system 200 may perform various types of operations to provide an interactive and targeted monitoring service in cooperation with service server 100. For example, processor 230 may include sub-processing blocks, such as identifying block 231, management block 232, monitoring block 233, and protection block 234. Processor 230 may perform operations using at least one of sub-processing blocks as follows.

Processor 230 may perform operations for i) identifying a registered user requesting the interactive and targeted monitoring service, ii) monitoring the registered user using monitoring devices 301 to 303, receiving location data from user equipment 400, and iii) determining whether an abnormal event occurs based on the monitoring result and the received location data.

In particular, processor 230 may receive a monitoring result from a plurality of monitoring devices 301 to 303 through communication circuit 210. Such a monitoring result may include images of the registered user captured by monitoring devices 301 to 303. Processor 230 may identify a target object to intensively monitor, which is designated by a registered user who requests an interactive and targeted monitoring. For example, processor 230 may analyze the images based on the stored information on the registered target object recognition signals with associated user equipment or registered users. Based on the analysis result, processor 230 may recognize a predetermined pattern generated based on one of the target object recognition signals, such as a predetermined image pattern, a predetermined light blinking pattern, a predetermined gesture made by an individual. Such a predetermined pattern may be displayed on user equipment 400 or actions taken by the registered user. Processor 230 may identify the recognized object as the target object to monitor.

Processor 230 may perform operations for controlling a plurality of monitoring devices 301 to 303, monitoring a target object (e.g., a registered user) using monitoring devices 301 to 303. Processor 230 may perform operation for generating various types of notification messages and transmitting the generated notification message to others through communication circuit 210 in order to notify status of an interactive and targeted monitoring service. Processor 230 may perform operation for managing and updating a location of user equipment 400 based on location data received through communication circuit 210.

Processor 230 may perform operation for determining whether an abnormal event occurs based on the location data from user equipment 400 and the monitoring result collected from monitoring devices 301 to 303. Processor 230 may determine that the abnormal event occurs i) when the target object moves outside of the service area, ii) when the target object deviates from a designated route, iii) when the target object stays still for a predetermined time period, iv) when the target object makes a predetermined signal, v) when the target object is attacked by other objects (e.g., person or animal), vi) when the target object falls down, vii) when the target object starts running, viii) when the target object is screaming, ix) when the target object becomes unavailable to monitor, and x) when an abnormal event signal is received from the registered user, and so forth. However, the present invention is not limited thereto. Upon the detection of the abnormal event, processor 230 may perform operations for transmitting a message for initiating protection procedure to service server 100 through communication circuit 210.

Processor 230 may perform operation for determining whether the abnormal event is terminated or eliminated. Upon the detection of the elimination of the abnormal event, processor 230 may perform operations for generating and transmitting a message to service server 100 to terminate the interactive and targeted monitoring service.

Figure 3:
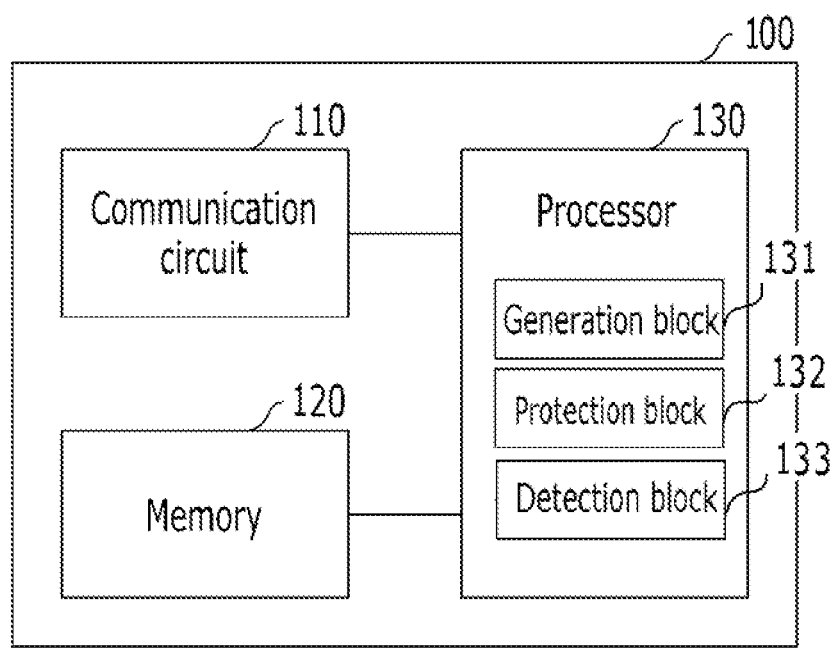
FIG. 3 illustrates a service server for providing an interactive and targeted monitoring service in accordance with at least one embodiment.

FIG. 3 illustrates a service server for providing an interactive and targeted monitoring service in accordance with at least one embodiment.

Referring to FIG. 3, service server 100 may include communication circuit 110, memory 120, and processor 130. Communication circuit 110 may be a circuitry for enabling service server 100 to communicate with other entities through communication network 500 based on various types of communication schemes. For example, communication circuit 110 may be referred to as a transceiver or a transmitter—receiver. In general, communication circuit 110 may transmit data to or receive data from other entities coupled to communication network 500 such as control system 200, monitoring devices 301 to 303, and user equipment 400 through communication network 500. For convenience and ease of understanding, service server 100 is illustrated as having one communication circuit in FIG. 3, but the present invention is not limited thereto. For example, service server 100 may include more than two communication circuits each employing different communication scheme. Communication circuit 110 may include at least one of a mobile communication circuit, a wireless internet circuit, a near field communication (NFC) circuit, a global positioning signal receiving circuit, and so forth. Particularly, communication circuit 110 may include a short distance communication circuit for short distance communication, such as NFC, and a mobile communication circuit for long range communication through a mobile communication network, such as long term evolution (LTE) communication or wireless data communication (e.g., WiFi).

In accordance with at least one embodiment, communication circuit 110 may receive a request message for an interactive and targeted monitoring service from user equipment 400, authentication data from user equipment 400, notification messages for status of an interactive and targeted monitoring service, location data of user equipment 400, a request message for initiating a protection procedure, a notification message for elimination of an abnormal event, and a request message for terminating an interactive and targeted monitoring service, monitoring results from control system 200. Communication circuit 110 may transmit an authentication data request message to user equipment 400, a target object recognition signal to control system 200 and user equipment 400, various types of notification messages to control system 200 and user equipment 400, location data of user equipment 400 to control system 200, a request message for terminating an interactive and targeted monitoring service to control system 200, and a request message for monitoring results to control system 200.

Memory 120 is a circuitry for storing various types of digital data including an operating system, at least one application, information and data necessary for performing operations associated with the interactive and targeted monitoring service. Memory 120 may store and manage information on target objects to monitor, information on target object recognition signals in connection with associated target object, location data, and monitoring results.

Processor 130 may be a central processing unit (CPU) that carries out the instructions of a predetermined program stored in memory 120 by performing basic arithmetic, logical, control and input/output operations specified by the instructions. In accordance with at least one embodiment, processor 130 of service server 100 may perform various types of operations to provide an interactive and targeted monitoring service in cooperation with control system 200. For example, processor 130 may include sub-processing blocks, such as generation block 131, protection block 132, and detection block 133, but the present invention is not limited thereto.

In accordance with at least one embodiment, processor 130 may perform operations for providing an interactive and targeted monitoring service in cooperation with control system 200 as follows. Processor 130 may perform operation for generating a target object recognition signal associated with a target object (e.g. user equipment 400) upon the receipt of a request for an interactive and targeted monitoring service from user equipment 400. The generated target object recognition signal may be transmitted to control system 200 and user equipment 400 through communication circuit 110. The target object recognition signal may be used to identify a target object to monitor. Such a target object recognition signal may include information on a graphical pattern, an image patter, a light blinking pattern, but the present invention is not limited thereto. User equipment 400 may produce and display a predetermined image pattern on a display thereof in response to the target object recognition signal. Furthermore, user equipment 400 may control constituent elements to perform a predetermined operation (e.g., blinking lights with a predetermined pattern) according to the target object recognition signal.

Processor 130 may perform operations for generating various messages, such as a message for requesting authentication data and for transmitting the generated message through communication circuit 110. The requested authentication data may be based on the authentication information included in the interactive and targeted monitoring service request message, such as a password which the registered user provided.

Processor 130 may perform operations for verifying the received authentication data, such as determining whether the received authentication data matches with authentication information stored in memory 120. Processor 130 may perform operation for terminating the interactive and targeted monitoring service. For terminating, processor 130 may also perform operation for removing the target object recognition signal and the information received from user equipment 400 and transmitting a request message for deleting the target object recognition signal stored in control system 200 and releasing the registered user from the target object to control system 200.

Processor 130 may perform operations for constantly tracking a location of the registered user based on location data regularly received from user equipment 400. When a request message for a protection procedure is received from user equipment 400, processor 130 may perform operations for generating a message for requesting images of the registered user at a current location of the registered user and transmitting the generated message to control system 200 through communication circuit 110. The captured images of the registered user may be received and stored in memory 120.

Processor 130 may perform operations for generating a message for reporting generation of an abnormal event or a request of a protection procedure on or around the registered user and transmitting the generated message to designated organizations, such as a police station, a fire station, a designated person, and so forth. The generated message may include the captured images of the registered user received from control system 200. Based on the captured images, the designated organization can clearly detect a current state of the registered user.

Processor 130 may perform operations for initiating a protection procedure based on information received from user equipment 400. Alternatively, processor 130 may perform operations for initiating a protection procedure upon receipt a request message from control system 200. The information received from user equipment 400 may include location data of user equipment 400 and may be received periodically at a predetermined interval.

Processor 130 may perform operations for detecting an abnormal event on or around the registered user based on the location data received from user equipment 400 and monitoring results from monitoring devices 301 to 303 or control system 200. For example, an abnormal event may occur when a moving speed of user equipment 400 (e.g., registered user) suddenly increases or decreases, when there is a sudden change in a moving direction of user equipment 400, or when user equipment 400 moves out of a service area or deviate from a predetermined route.

Upon detecting an abnormal event, processor 130 may perform operations for generating a message for requesting authentication data and for transmitting the generated message to user equipment 400 through communication circuit 110. In case of no response from the registered user in response to the request message, processor 130 may perform operations for generating a message for requesting a protection procedure at a location of user equipment 400 and for transmitting the generated message to designated organizations through communication circuit 110.

For example, user equipment 400 may not be responsive to the message received from service server 100, when a battery of user equipment 400 is detached from user equipment 400 or when user equipment 400 is not able to communicate through communication network 500. These abnormal conditions of user equipment 400 may be detected with various methods, but the present invention is not limited to one method.

Processor 130 may perform operations for initiating a protection procedure as follows. For example, processor 130 may perform an operation for initiating the protection procedure upon detection of an abnormal event. In particular, processor 130 may perform operations for calculating a moving speed of user equipment 400 based on location data periodically received from user equipment 400 at a predetermined interval. Processor 130 may then perform operations for determining whether the calculated moving speed of user equipment 400 is increasing or decreasing at a rate greater or less than a predetermined rate.

Alternatively, processor 130 may perform operations for calculating a route to a destination based on information received within an interactive or targeted monitoring service request message. Processor 130 may then perform operations for determining whether user equipment 400 moves outs of a calculated route based on location data periodically received from user equipment 400 at a predetermined interval and information on destination stored in memory 120.

Furthermore, processor 130 may perform operations for determining whether user equipment 400 moves out of a service area based on location data periodically received from user equipment 400 at a predetermined interval.

When processor 130 determines that the moving speed of user equipment 400 is increasing or decreasing at a rate greater or less than a predetermined rate or user equipment 400 moves out of the service area, processor 130 may perform operations for generating a message for requesting authentication data and for transmitting the generated message to user equipment 400 through communication circuit 110.

Processor 130 may perform operations for verifying the authentication data, such as determining whether the received authentication data matches with authentication information stored in memory 120. When the authentication data received from user equipment 400 matches the authentication information on user equipment 400 stored in memory 120, processor 130 may perform operations for keep providing the interactive and targeted monitoring service. When the authentication data received from user equipment 400 does not match the authentication information on user equipment 400 stored in memory 120, processor 130 may perform operations for initiating a protection procedure. The authentication data may be a password set by the registered user when the registered user registers at control server 100 for the interactive and targeted monitoring service.

Processor 130 may perform operations for determining whether a battery is detached from user equipment 400 or whether user equipment 400 is unable to communicate with service server 100 through communication network 500. Determining whether the battery is detached from user equipment 400 or whether user equipment 400 is unable to communicate with service server 100 through communication network 500 may be achieved with various methods, but the present invention is not limited to one method.

When processor 130 detects an abnormal event, determines that a battery is detached from use equipment 400, or user equipment 400 is unable to communicate with service server 100 through communication network 500, processor 130 may perform operations for initiating a protection procedure. For example, processor 130 may perform operations for generating a message for requesting an emergency service to relevant organizations. The generated message may include latest location data received from user equipment 400 or information on user equipment 400 including a phone number or an identification number.

Figure 4:
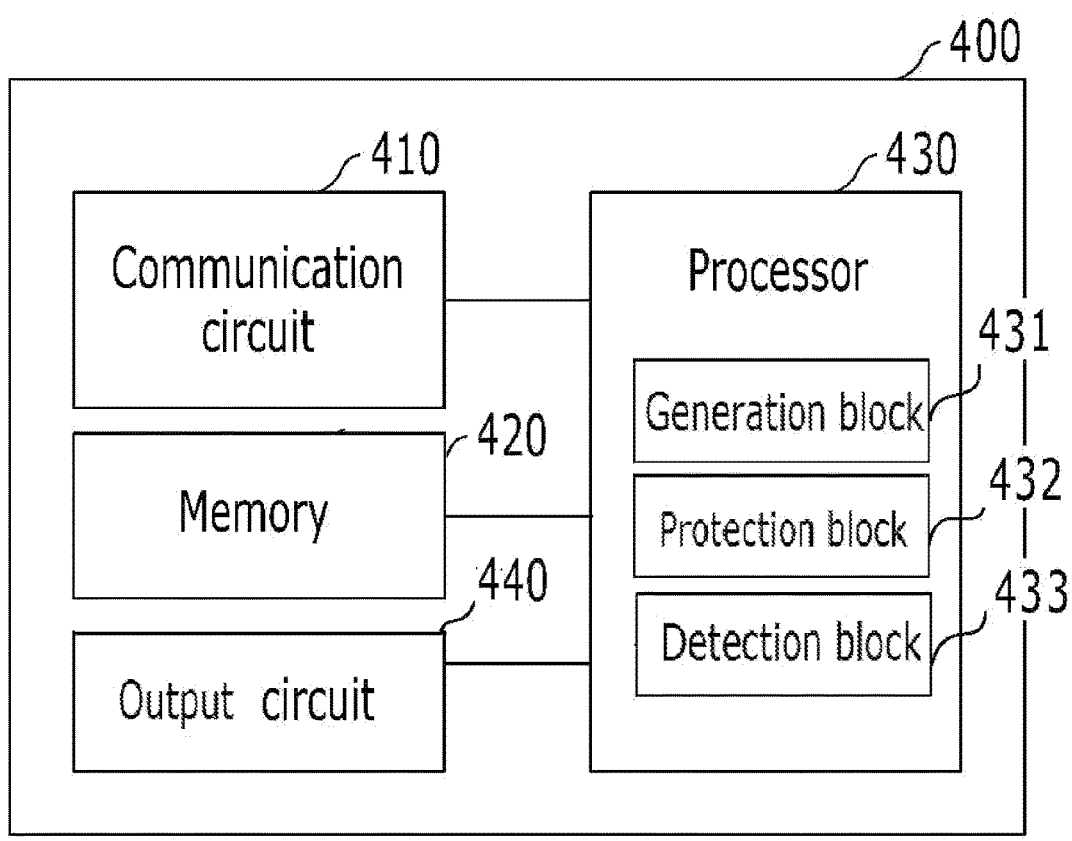
FIG. 4 illustrates user equipment in accordance with at least one embodiment.

FIG. 4 illustrates user equipment in accordance with at least one embodiment.

Referring to FIG. 4, user equipment 400 may include communication circuit 410, memory 420, processor 430, and output circuit 440. Communication circuit 410 may be a circuitry for enabling user equipment 400 to communicate with other entities through communication network 500 based on various types of communication schemes. For example, communication circuit 410 may be referred to as a transceiver or a transmitter—receiver. In general, communication circuit 410 may transmit data to or receive data from other entities coupled to communication network 500 such as control system 200, monitoring devices 301 to 303, and service server 100 through communication network 500. For convenience and ease of understanding, user equipment 400 is illustrated as having one communication circuit in FIG. 5, but the present invention is not limited thereto. For example, user equipment 400 may include more than two communication circuits each employing different communication scheme. Communication circuit 410 may include at least one of a mobile communication circuit, a wireless internet circuit, a near field communication (NFC) circuit, a global positioning signal receiving circuit, and so forth. Particularly, communication circuit 410 may include a short distance communication circuit for short distance communication, such as NFC, and a mobile communication circuit for long range communication through a mobile communication network, such as long term evolution (LTE) communication or wireless data communication (e.g., WiFi).

In accordance with at least one embodiment, communication circuit 410 may receive an authentication data request message from service server 100, an authentication failure message from service server 100, a target object recognition signal from service server 100, and various types of notification messages from service server 100 and control system 200. For example, communication circuit 410 may receive messages from service server 100 notifying that an interactive and targeted monitoring service is initiated, user equipment 400 moved out of a service area, user equipment 400 returned to a service area, and an interactive and targeted monitoring service is terminated. Communication circuit 410 may transmit an interactive and targeted monitoring service request message to service server 100, authentication data of the registered user to service server 100, location data of user equipment 400 to service server 100, a message for notifying an emergency to service server 100, and an interactive and targeted monitoring service termination request to service server 100.

Memory 420 is a circuitry for storing various types of digital data including an operating system, at least one application, information and data necessary for performing operations associated with the interactive and targeted monitoring service. Memory 420 may store and manage information on target objects to monitor, information on target object recognition signals in connection with associated target object, location data, and monitoring results.

Processor 430 may be a central processing unit (CPU) that carries out the instructions of a predetermined program stored in memory 420 by performing basic arithmetic, logical, control and input/output operations specified by the instructions. In accordance with at least one embodiment, processor 430 of user equipment 400 may perform various types of operations to generate an interactive and targeted monitoring service request message, an interactive and targeted monitoring service termination message or generate other messages in response to communications with other entities coupled with communication network, such as control system 200 and service server 100. For example, processor 430 may include sub-processing blocks, such as interactive and targeted monitoring service request or interactive and targeted monitoring service termination block 431, target object recognition signal analysis block 432, and authentication data request analysis block 433.

In accordance with at least one embodiment, when an input from the registered user for requesting an interactive and targeted monitoring service is received through a user interface displayed on output circuit 440, processor 430 may perform operations for generating an interactive and targeted monitoring service request message and for transmitting the generated message to service server 100 through communication circuit 410. The generated message may include authentication data of the registered user and information on a destination and user equipment 400. The information on user equipment 400 may include a phone number, an identification number, and so on.

When an input from the registered user is received through a user interface displayed on output circuit 440 for terminating an interactive and targeted monitoring service, processor 420 may perform operations for generating a message for terminating an interactive and targeted monitoring service, and for transmitting the generated message to service server 100 through communication circuit 410.

When an input from the registered user is received through a user interface displayed on output circuit 440 for notifying an abnormal event or requesting a protection procedure, processor 420 may perform operations for generating a message for requesting a protection procedure and transmit the generated message to designated organizations. The input may be received before, during, or after the interactive and targeted monitoring service.

Conversely, when an input from the registered user is received through a user interface displayed on output circuit 440 for notifying a termination of an abnormal event, processor 420 may generate a message for notifying a termination of an abnormal event and transmit the generated message to related organizations. The generated message may include location data and authentication data of user equipment 400.

In accordance with one embodiment, when the registered user is unable to input authentication data during the abnormal event, authentication data stored in memory 430 may be transmitted through communication circuit 410.

Processor 420 may generate messages requesting or terminating the interactive and targeted monitoring service and messages alerting the occurrence or the termination of the abnormal event, in accordance with at least one embodiment. When there is a separate input device (e.g., a key pad) for receiving an input for requesting or terminating the interactive and targeted monitoring service, another separate input device may be used to receive an input for alerting the occurrence or the termination of the abnormal event.

Processor 420 may perform operations for generating predetermined patterns or gestures based on a target object recognition signal received from service server 100. The target object recognition signal received from service server 100 may be displayed on output circuit 440 of user equipment 400, and monitoring device 301 to 303 may recognize the target object recognition signal displayed on user equipment 400.

Processor 430 may perform operations for presenting or displaying an authentication request message received from service server 100 to the registered user. The authentication data request message may be displayed on output circuit 440 of user equipment 400 for receiving an input from the registered user.

When the input is received from the registered user in response to the authentication request message received from service server 100, processor 420 may perform operations for generating a message containing the input received from the registered user and for transmitting the generated message to service server 100 through communication circuit 410.

Processor 420 may perform operations for periodically collecting location data of user equipment 400 at a predetermined interval, for generating a message which containing the collected location data, and for transmitting the generated message to service server 100 through communication circuit 410. The location data may be collected with various methods, but such methods are not described herein.

Output circuit 440 may display various messages received from service server 100 to the registered user. For example, output circuit 440 may display a graphic user interface for enabling the registered to interact with service server 100. Furthermore, output circuit 440 may display a predetermined image pattern or a light blinking pattern generated based on the target object recognition signal.

Hereinafter, a method of providing an interactive and targeted monitoring service will be described in detail with reference to FIG. 5 to FIG. 10. For convenience and ease of understanding, an interactive and targeted monitoring service will be described as receiving a request from a registered user and monitoring the registered user who requests the service, but the present invention is not limited thereto. That is, the registered user may designate a target object to monitor (e.g., another specific individual).

Figure 5:
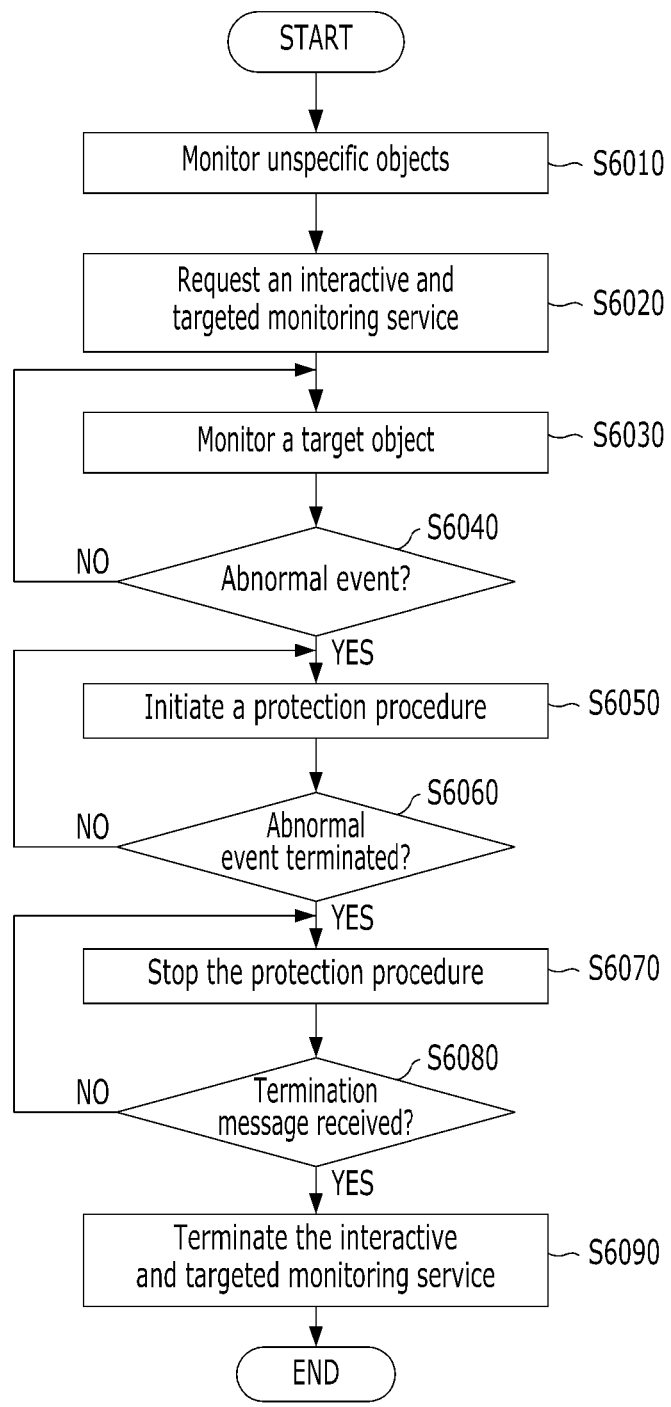
FIG. 5 illustrates providing an interactive and targeted monitoring service in accordance with at least one embodiment.

FIG. 5 illustrates providing an interactive and targeted monitoring service in accordance with at least one embodiment.

Referring to FIG. 5, control system 200 may monitor unspecified individuals in a service area with monitoring devices 301 to 303 at step S5010. For example, control system 200 may receive information on activities occurring at the service area from monitoring devices 301 to 303. The received information may include images captured by monitoring devices 301 to 303. Control system 200, in cooperation with service server 100, may perform a typical monitoring service in the service area based on the received images.

At step S5020, an interactive and targeted monitoring service request message may be received. For example, service server 100 may receive an interactive and targeted monitoring service request message from a registered user through communication network 500. In particular, user equipment 400 receives a user input from the registered user through a predetermined input circuit, such as a touch screen, a designated button, a motion sensor, a microphone, and so forth. In response to such a user input, user equipment 400 may execute a predetermined application for the interactive and targeted monitoring service, produce a graphic user interface that enables a registered user to initiate and request the interactive and targeted monitoring service and to enter information necessary for the interactive and targeted monitoring service. User equipment 400 receives a user input through the displayed graphic user interface and generates an interactive service request message and transmits the generated interactive service request message to service server 100.

At step S5030, a target object may be monitored based on the interactive and targeted monitoring service request message. For example, control system 200 may identify the registered user who requests the interactive and targeted monitoring service based on a target object recognition signal generated and transmitted to user equipment 400 of the registered user. Control system 200 may initiate the interactive and targeted monitoring service and transmit a notification message to service server 100.

In particular, service server 100 may request control system 200 to intensively monitor the identified target object in the service area based the interactive and targeted monitoring service request message. The interactive and targeted monitoring service request message may include information on an identity of a registered user, an authentication data of a registered user, an identification number of user equipment 400, and an area requested for the interactive and targeted monitoring service. Alternatively, the registered user may request service server 100 to monitor him/her as a target object In response to the request, control system 200 intensively monitors the registered user as the target object in the service area using monitoring devices 301 to 303. Control system 200 may, regularly or in real-time, transmit monitoring results to service server 100.

At step S5040, determination may be made as to whether an abnormal event occurs. For example, control system 200 may determine an occurrence of an abnormal event based on the monitoring results received from a plurality of monitoring devices 301 to 303. The monitoring results may include the images of the registered user received from monitoring devices 301 to 303.

The abnormal event may denote unusual activities made by the registered user or by others around the registered user. Such abnormal event may be defined by at least one of a system designer, an operator, a service provider, registered users, and so forth. For example, control system 200 may determine the abnormal event occurs when the target object moves outside of the service area, when the target object deviates from a designated route, when the target object stays still for a predetermined time period, when the target object makes a predetermined signal, when the target object is attacked by other objects (e.g., person or animal), when the target object falls down, when the target object starts running, when the target object is screaming and so forth.

Such abnormal event may be detected through various methods, but the present invention is not limited to one specific method of detecting the abnormal event. For example, characteristics of the target object may be measured or estimated based on the monitoring results. Such characteristics may include a moving speed, a moving direction, a motion range, and a voice level. When the measured or estimated characteristics are higher than a predetermined threshold, service server 100 or control system 200 may determine that an abnormal event occurs.

When the abnormal event is not detected (No—S5040), the target object may be continuously monitored at step S5030. For example, control system 200 may continuously monitor the target object in cooperation with service server 100 when control system 200 does not find any abnormal events occurring in association with the registered user.

When the abnormal event is detected (Yes—S5040), a protection procedure may be initiated at step S5050. The protection procedure may be predetermined by at least one of a system designer, an operator, a service provider, and a user. For example, upon the detection of the abnormal event as a result of monitoring, control server 200 may trigger a protection procedure while continuously monitoring the registered user as the target object. Control server 200 may transmit a request message for the protection procedure to service server 100. In response to the request message, service server 100 may initiate the protection procedure. That is, service server 100 may perform a set of processes for protecting the registered user from the abnormal event.

The predetermined protection procedure may denote a set of processes to protect the target object (e.g., the registered user). For example, as the protection procedure, service server 100 generates an informing message based on a known communication protocol such as LTE, WiFi, or 3GPP and transmits the generated informing message to a designated station, such as a police station, a fire department, a designated emergency contact, a residence of the registered user to inform them of the abnormal event. The informing message may include a telephone call with a voice message, a text message, and a captured image of the abnormal event, and so forth.

Furthermore, service server 100 remotely controls predetermined electronic devices to protect the registered user. For example, service server 100 may control a display device or a speaker near the registered user to display or to output a warning message to the registered user or others around registered user. Service server 100 may also control at least one of constituent elements of user equipment 400.

At step S5060, determination may be made as to whether the detected abnormal event is terminated. For example, the detected abnormal event may be terminated or alleviated when the target object moved outside of the service area or deviated from a predetermined route comes back to the service area, when the monitoring of the target object becomes available, or when an abnormal event termination signal is received from the registered user. The abnormal event terminal signal may be generated and transmitted by user equipment 400 in response to a user input.

In addition, control system 200 receives the monitoring results from monitoring devices 301 to 303 during the occurrence of the abnormal event. At least one of service server 100 and control system 200, based on the monitoring results, determines whether the abnormal event is terminated.

When the detected abnormal event is not terminated (No—S5060), the protection procedure may be continuously performed at step S5050. For example, when one of service server 100 and control system 200 determines that the abnormal event is not terminated, control system 200 continuously perform the protection procedure initiated at step S5050.

When the detected abnormal event is terminated (Yes—S5060), the protection procedure may be stopped and the target object is continuously monitored at step S5070. For example, when service server 100 or control system 200 determines that the abnormal event is terminated, service server 100 stops the protection procedure and control system 200 continuously monitors the target object.

At step S5080, determination may be made so to whether a termination message for terminating the interactive and targeted monitoring service is received. For example, service server 100 may determine whether a message for requesting a termination of the interactive and targeted monitoring service is received from user equipment 400. Such message may be generated and transmitted by user equipment 400 when the register user safely arrives at a destination. In particular, service server 100 receives the termination request message from user equipment 400. User equipment 400 receives a user input for terminating the monitoring service from the service registered user through a predetermined input circuit, such as a touch screen, a designated button, a motion sensor, a microphone, and so forth. In response to such a user input, user equipment 400 may generate the termination request message and transmit the generated termination request message to service server 100.

When the termination request message is not received (No—S5080), the interactive and targeted monitoring service may be continuously provided to the registered service user at step S5030. When the termination request message is received (Yes—S5080), the interactive and targeted monitoring service may be ended at step S5090 and a typical monitoring service may be continuously provided at step S5010.

The protection procedure was described as being performed during the interactive and targeted monitoring service, but the present invention is not limited thereto. The protection procedure may be performed during the typical monitoring service upon the detection of the abnormal event of the registered user.

As described, the interactive and targeted monitoring service may be initiated by a user request. Such operation will be described in more detail with reference to FIG. 6.

Figure 6:
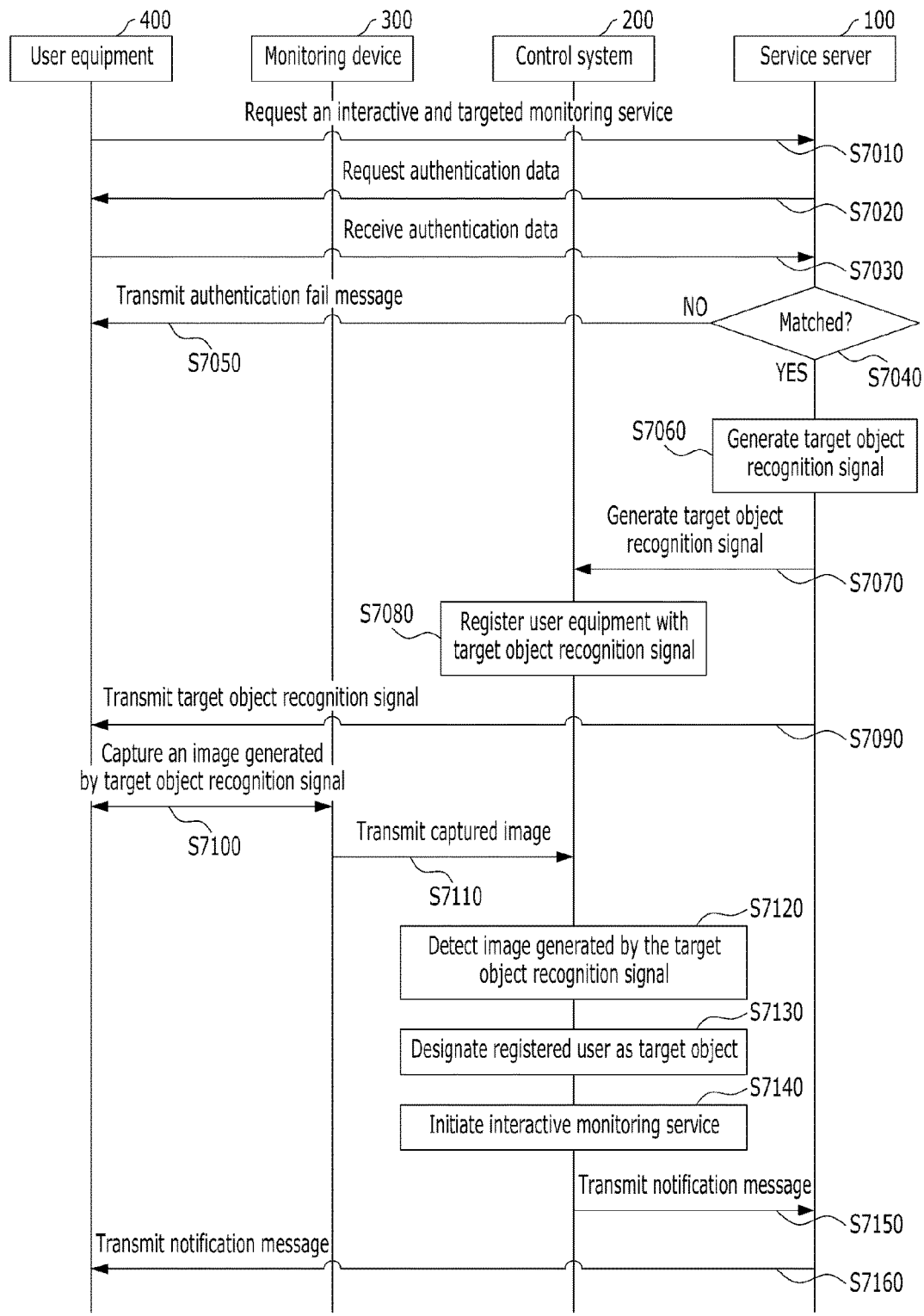
FIG. 6 illustrates requesting an interactive and targeted monitoring service in accordance with at least one embodiment.

FIG. 6 illustrates requesting an interactive and targeted monitoring service in accordance with at least one embodiment.

Referring to FIG. 6, user equipment 400 may request an interactive and targeted monitoring service to service server 100 at step S6010. For example, user equipment 400 may generate a message for requesting an interactive and targeted monitoring service and transmit the generated request message to service server 100 through communication network 500. In particular, user equipment 400 generates the interactive monitoring request message upon receiving an input from the registered user through a graphic user interface produced and displayed on user equipment 400 and transmits the interactive and targeted monitoring service request message to service serve 100 through communication network 500.

The interactive monitoring request message may include information on an identity of a registered user, an authentication data of a registered user, a password set by a registered user for an authentication, and an identification number of user equipment 400. The interactive monitoring request message may further include information on a location of user equipment 400 and a destination in which the registered user intends to travel to.

At step S6020, service server 100 may receive the interactive and targeted monitoring service request from user equipment 400, and request authentication data to the registered user. For example, in response to the interactive and targeted monitoring service request message received from user equipment 400, service server 100 may generate a message for requesting authentication data (e.g., password) in order to determine whether a user is legally registered at service server 100 for the interactive and targeted monitoring service.

For example, service server 100 i) receives the interactive and targeted monitoring service request message from user equipment 400, ii) generates an authentication request message, and iii) transmits the generated authentication request message to user equipment 400 through communication network 500. In particular, service server 100 may extract information included in the interactive and targeted monitoring service request message, such as a password of the registered user to use the interactive and targeted monitoring service, and store the extracted information in a memory 130 in connection with information on the registered user. As the authentication request message, service server 100 may generate a message for requesting the registered user to enter the password. The authentication request message, when displayed on user equipment 400, may direct the registered user to input the authentication data (e.g., a password) on user equipment 400. Upon the receipt of the authentication request message, user equipment 400 may produce and display a graphic user interface on a display to invite a user to enter the authentication data.

At step S6030, service server 100 may receive the authentication data from user equipment 400. For example, the registered user may enter the authentication data (e.g., password) on user equipment 400 in response to the authentication request message. That is, user equipment 400 may receive an input for the authentication data from the registered user, generate a message which includes the authentication data, and transmit the generated message to service server 100.

At step S6040, service server 100 may determine whether the authentication data matches to information previously received in the interactive and targeted monitoring service request message. For example, service server 100 may determine whether the authentication data received in response to the authentication request message matches the information received in the interactive and targeted monitoring service request message.

When the authentication data does not match the information received in the interactive and targeted monitoring service request message (No—S6040), service server 100 may generate and transmit an authentication failure message to user equipment 400 at step S6050.

When the authentication data matches the information received in the interactive and targeted monitoring service request message (Yes—S6040), service server 100 may generate a target object recognition signal at step S6060.

At step S6070, service server 100 may transmit the generated target object recognition signal and the interactive and targeted monitoring service request message received from user equipment 400 to control system 200. For example, service server 100 transmits the generated target object recognition signal, the interactive and targeted monitoring service request message received from user equipment 400, and the information received within the interactive and targeted monitoring service request message control system 200.

At step S6080, control system 200 may receive and store the target object recognition signal, the interactive and targeted monitoring service request message, and the information received within the interactive and targeted monitoring service request message. Control system 200 may store all of the information received from service server 100 in connection with the information on the registered user. That is, control system 200 may register user equipment 400 with the target object recognition signal.

At step S6090, service server 100 may transmit the target object recognition signal to user equipment 400. For example, service server 100 transmits the target object recognition signal to user equipment 400. User equipment 400 receives the target object recognition signal from service server 100 and performs a predetermined operation based on the target object recognition signal to make at least one of service server 100 and control system 200 to recognize user equipment 400 as the target object to monitor. For example, user equipment 400 may generate a predetermined image pattern based on the target object recognition signal and display the generated image pattern on display 440 or control a light mounted on user equipment 400 to emit a predetermined blinking pattern. The target object recognition signal may include an image pattern, a graphic pattern, a flash light blink pattern, a sound pattern, and so forth.

At step S6100, monitoring devices 301 to 303 may capture images of user equipment 400 performing the predetermined operation based on the target object recognition signal. For example, the registered user (e.g., owner of user equipment 400) may present the image pattern displayed on user equipment 400 to at least one of monitoring devices 301 to 303. Then, the at least one of monitoring devices 301 to 303 may detect the image pattern displayed on user equipment 400 or the light blinking pattern emitted from user equipment 400.

At step S6110, monitoring devices 301 to 303 may transmit the captured images as a monitoring result to control system 200. At step S6120, control system 200 may detect the predetermined image pattern or the light blinking pattern produced based on the target object recognition signal and confirm whether the detected image pattern or the light blinking pattern is matched with the target object recognition signal transmitted to the registered user.

At step S6130, control system 200 may designate user equipment 400 (e.g., the registered user) as the target object for the interactive and targeted monitoring service. At step S6140, control system 200 may initiate the interactive and targeted monitoring service on the target object. At step S6150, control system 200 may transmit an inform messages to service server 100 of the initiation of the interactive and targeted monitoring service.

At step S6160, service server 100 may transmit a notification message. For example, once receiving the monitoring message indicating that the interactive and targeted monitoring service on the target object is initiated, service server 100 may send a notification message to user equipment 400 alerting the registered user that the registered user is under the interactive and targeted monitoring service.

The interactive and targeted monitoring service may assign the registered user as the target object and enables identifying the target object from others. The interactive and targeted monitoring service may alert the registered user that he/she is under the interactive and targeted monitoring service so that the registered user feels safe during the interactive and targeted monitoring service.

Figure 7:
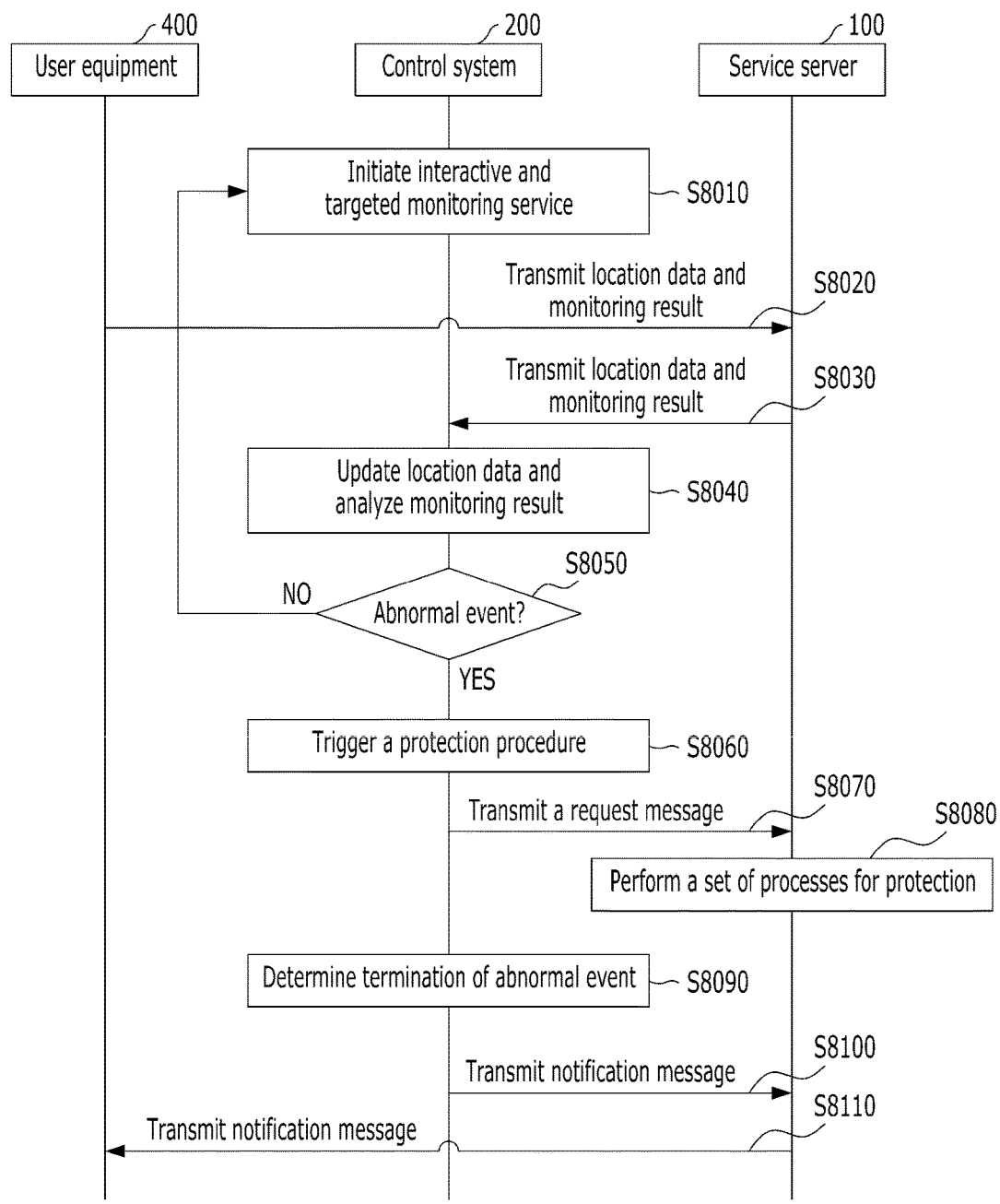
FIG. 7 illustrates providing an interactive and targeted monitoring service to a registered user in accordance with at least one embodiment.

FIG. 7 illustrates providing an interactive and targeted monitoring service to a registered user.

Referring to FIG. 7, control system 200 may initiate the interactive and targeted monitoring service at S7010. For example, after detecting the predetermined image pattern displayed on or the light blinking pattern generated from user equipment 400, control system 200 may determine the registered user of user equipment 400 as the target object and initiate the interactive and targeted monitoring service on the target object.

At step S7020, user equipment 400 may transmit location data and control system 200 may transmit a monitoring result to service server 100. For example, user equipment 400 may transmit location data periodically to service server 100. Service server 100 may receive the location data of user equipment 400 at a predetermined interval. The location of user equipment 400 may be determined periodically and transmitted to service server 100. In particular, user equipment 400 determines and stores the location data based on a global positioning system (GPS) at given intervals and the determined location data periodically to service server 100.

At step S7030, service server 100 may transmit the location data of user equipment 400 to control system 200. For example, after receiving the location data from user equipment 400, service server 100 may transmit the location data of user equipment 400 to control system 200.

At step S7040, control system 200 may update the current location of user equipment 400 and analyze the received information. For example, control system 200 may receive the location data of user equipment 400 from service server 100 and update the current location user equipment 400 based on the location data received from service server 100.

At step S7050, control system 200 may determine whether an abnormal event is occurring based on the received location data of user equipment 400 and monitoring results collected from monitoring devices 301 to 303. For example, service server 100 may determine the abnormal event occurs when the target object moves outside of the service area, when the target object deviates from a designated route, when the target object stays still for a predetermined time period, when the target object makes a predetermined signal, when the target object is attacked by other objects (e.g., person or animal), when the target object falls down, when the target object starts running, when the target object is screaming and so forth. The interactive and targeted monitoring service may be unavailable in areas outside of the service area.

When control system 200 determines that the abnormal event is not occurring (No—S7050), the interactive and targeted monitoring service may continuously be performed at step S7010. Control system 200 continuously and intensively monitors the registered user as the target object to monitor when user equipment 400 is within the service area and is present in the images received from monitoring devices 301 to 303.

When control system 200 determines that the abnormal event is occurring (Yes—S7050), control system 200 may trigger a protection procedure at step S7060. For example, upon the detection of the abnormal event, at least one of control system 200 and service server 100 may initiate the protection procedure while continuously monitoring the registered user as the target object.

At step S7070, control system 200 may transmit a request message for initiating the protection procedure to service server 100. For example, when the protection procedure is triggered, control system 200 may send a request message for initiating the protection procedure.

At step S7080, service server 100 may perform a set of predetermined operations as the protection procedure and transmit an alert message to user equipment 400. For example, service server 100 may generate an informing message based on a known communication protocol such as LTE, WiFi, or 3GPP and transmits the generated informing message to a designated station, such as a police station, a fire department, a designated emergency contact, a residence of the registered user to inform them of the abnormal event. The informing message may include a telephone call with a voice message, a text message, and a captured image of the abnormal event, and so forth. Furthermore, service server 100 remotely controls predetermined electronic devices to protect the registered user. For example, service server 100 may control a display device or a speaker near the registered user to display or to output a warning message to the registered user or others around registered user. Also, service server 100 may transmit the area alert message to the user equipment 400 alerting that the abnormal event is occurring around or at the registered user, such as the registered user is outside of the service area. In accordance with another embodiment, service server 100 may initiate the protection procedure, without receiving the request massage from control system 200, based on information received from user equipment 400

At step S7090, control system 200 may determine that the abnormal event is terminated or receive an abnormal event termination signal. For example, control system 200 continuously monitors the registered user and determines the occurred abnormal event is terminated based on the monitoring result or determines the registered user returns back to the service area. Or, the abnormal event terminal signal may be generated and transmitted by user equipment 400 in response to a user input.

At step S7100, control system 200 may transmit a notification message to service server 100. For example, control system 200 may transmit the notification message to service server 100 indicating that the abnormal event is terminated.

At step S7110, service server 100 may transmit the notification message to user equipment 400. For example, service server 100, after receiving the notification message from control system 200, may transmit the notification message to user equipment 400 notifying the registered user that the abnormal event is terminated.

For example, control system 200, in cooperation with service server 100, may constantly monitor the registered user (e.g., user equipment 400) and alert the registered user when the registered user is outside of the service area. Service server 100 may direct the registered user to enter the service area.

Figure 8:
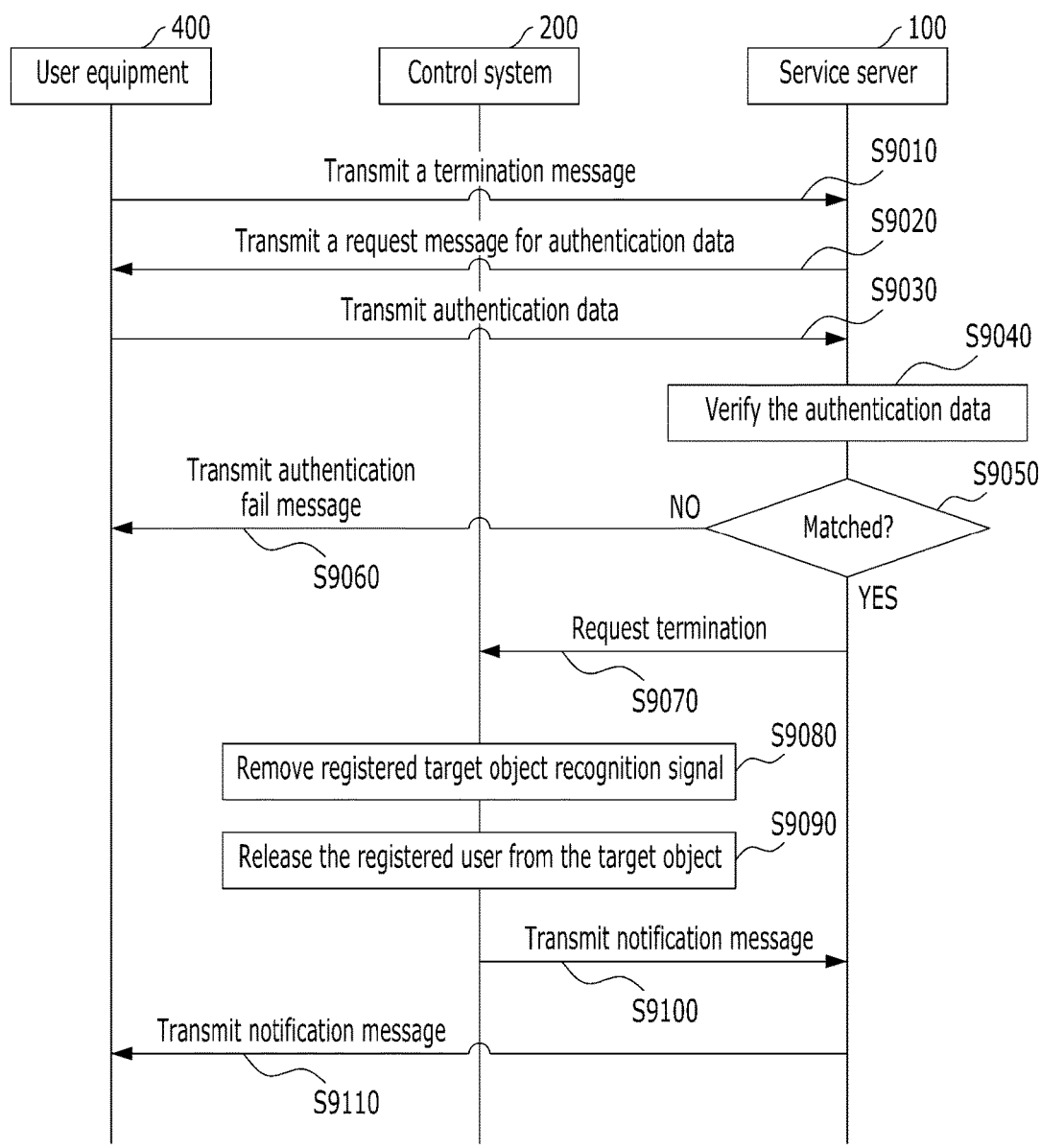
FIG. 8 illustrates an operation for terminating an interactive and targeted monitoring service in accordance with at least one embodiment.

FIG. 8 illustrates an operation for terminating an interactive and targeted monitoring service in accordance with at least one embodiment.

Referring to FIG. 8, at step S8010, user equipment 400 may transmit a request message for terminating the interactive and targeted monitoring service to service server 100. For example, user equipment 400 may provide a graphic user interface to receive an input from the registered user for terminating the interactive and targeted monitoring service. When the input is received from the registered user, a request message for terminating interactive and targeted monitoring service may be generated. User equipment 400 may transmit the generated request message for terminating the interactive and targeted monitoring service to service server 100.

At step S8020, service server 100 may request authentication data to user equipment 400. For example, Service server 100 may generate an authentication request message and transmit the generated message to user equipment 400 through communication network 500.

At step S8030, user equipment 400 may transmit the authentication data to service server 100 in response to the request. For example, user equipment 400 may receive the authentication request message from service server 100. In response to the authentication request message, user equipment 400 may request the registered user to enter the requested authentication data (e.g. password) through a predetermined graphic user interface, receive a user input from the registered user through the graphic user interface, generate a response message based on the authentication data received from the registered user. User equipment 400 may transmit the response to the authentication request message to service server 100.

At step S8040, service server 100 may receive the response message from user equipment 400 and verify the authentication data included in the response message. For example, service server 100 may extract identification data and the authentication data included in the response message and compares the extracted data with authentication data stored in connection with the registered user.

At step S8050, service server 100 may determine whether the authentication data received from user equipment 400 matches to the information of the registered user stored in the memory. When the authentication data does not matches the information (No—S8050), service server 100 may transmit an authentication failure message at step S8060. When the authentication data matches with the information stored in connection with the registered user (Yes—S8060), service server 100 may transmit a request message to control system 200 for terminating the interactive and targeted monitoring service at step S8070.

At step S8080, control system 200 may remove information on the target object recognition signal associated with the registered user. The request message may include information on the target object recognition signal generated in response to the interactive monitoring request message received from user equipment 400. Based on the request message received from service server 100, control system 200 may delete and remove the target object recognition signal.

At step S8090, control system 200 may stop providing the interactive and targeted monitoring service and may perform a typical monitoring operation for monitoring unspecified individuals or public places. At step 8100, control system 200 may transmit an notification message to service server 100 for informing service server 100 that the interactive and targeted monitoring service is terminated. At step 8110, service server 100 may receive the notification message from control system 200 and transmit a notification message to user equipment 400 to inform the registered user of the termination of the interactive and targeted monitoring service.

As described, service server 100 may request the authentication data to user equipment 400 for terminating the interactive and targeted monitoring service. Such operation is for preventing the interactive mentoring service from being terminated under duress or by accident.

Hereinafter, the protection procedure will be described with reference to FIG. 9.

Figure 9:
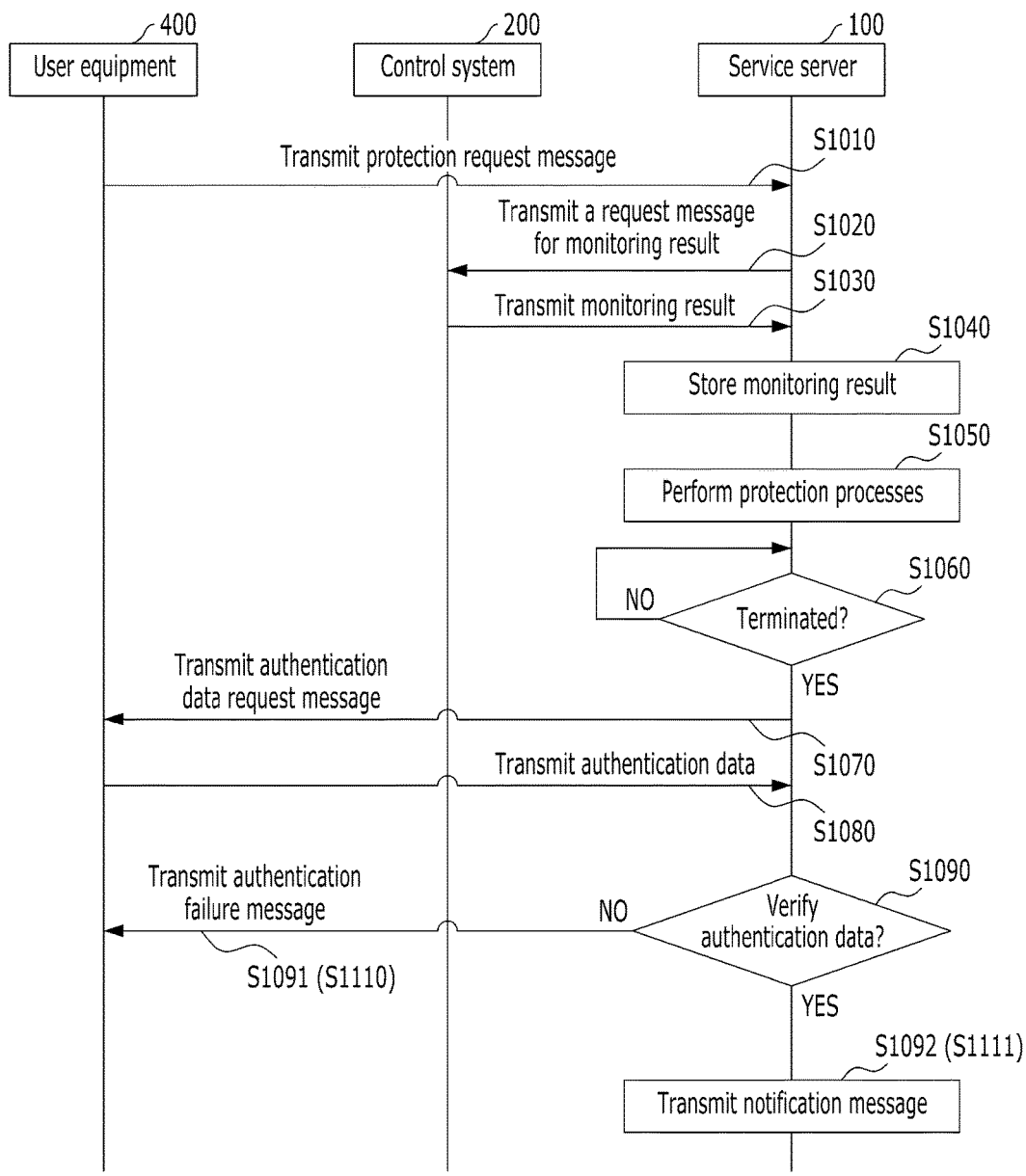
FIG. 9 illustrates a protection procedure of an interactive and targeted monitoring service in accordance with at least one embodiment.

FIG. 9 illustrates a protection procedure of an interactive and targeted monitoring service in accordance with at least one embodiment.

Referring to FIG. 9, at step S9010, user equipment 400 may transmit a protection request message to service server 100. For example, a protection procedure may be initiated by a registered user through user equipment 400 as well as when an abnormal event is detected. In particular, such a protection procedure may be initiated by user equipment 400 when user equipment receives a predetermined input from the registered user. The predetermined input may include i) a motion input made by detecting a predetermined gesture of the registered user, ii) a voice input generated by detecting a predetermined voice command from the registered user, iii) a touch input made on a predetermined icon displayed within a predetermined graphic user interface on user equipment 400, and iv) an activation input made on a predetermined button or a key of user equipment 400.

In particular, the registered user may initiate the protection procedure through user equipment 400 when an emergency or an abnormal event occurs. In response to such an initiation, user equipment 400 may generate a request message for requesting the protection procedure and transmit the generated request message to service server 100.

The generated request message may include location and authentication data of the registered user. When the registered user is unable to provide the location data or the authentication data, user equipment 400 includes the latest location and authentication data in the request message, which is stored in user equipment 400.

At step S9020, service server 100 may request control system 200 to provide a monitoring result of monitoring the target object (e.g., the registered user). For example, in response to the request message for the protection procedure, service server 100 may generate a request message for images of the registered user and transmit the generated request message to control system 200.

At step S9030, control system 200 may transmit the monitoring result of the registered user in response to the request message. For example, control system 200 may receive the request message from service server 100, extract the location data from the request message, collect the images of the registered user from associated monitoring devices based on the extracted location data of the registered user (or retrieve stored images of the registered user from a database), and transmit the collected image to service server 100 as the monitoring result. Service server 100 may request recorded images of the registered user at a given location and in a given time for a certain time period. Control system 200 may retrieve the recorded images of the registered user and transmit the recorded images to service server 100.

At step S9040, service server 100 may receive the monitoring result (e.g., images) and store the received monitoring result in an associated database. For example, service server 100 may receive the recorded or captured images of the registered user from control system 200 and store the received images in the memory in connection with information on the registered user.

At step 9050, service server 100 may perform a set of processes to protect the target object (e.g., the registered user). For example, as the protection procedure, service server 100 generates an informing message based on a known communication protocol such as LTE, WiFi, or 3GPP and transmits the generated informing message to a designated station, such as a police station, a fire department, a designated emergency contact, a residence of the registered user to inform them of the abnormal event. The informing message may include a telephone call with a voice message, a text message, and a captured image of the abnormal event, and so forth.

Furthermore, service server 100 remotely controls predetermined electronic devices to protect the registered user. For example, service server 100 may control a display device or a speaker near the registered user to display or to output a warning message to the registered user or others around registered user.

At step S9060, service server 100 may determine whether an abnormal event termination message is received. For example, service serve 100 may determine whether user equipment 400 transmits the message indicating that the abnormal event is terminated. As described, such a message may be generated and transmitted by user equipment 400 in response to a predetermined input made by the registered user. Furthermore, the detected abnormal event may be terminated or alleviated when the target object moved outside of the service area or deviated from a predetermined route comes back to the service area, when the monitoring of the target object becomes available, or when an abnormal event termination signal is received from the registered user. In this case, the abnormal event termination signal may be generated and transmitted by user equipment 400 or control system 200. That is, control system 200 receives the monitoring results from monitoring devices 301 to 303 during the occurrence of the abnormal event. At least one of service server 100 and control system 200, based on the monitoring results, determines whether the abnormal event is terminated and transmits the abnormal event termination message based on the determination result.

At step S9070, service server 100 may request the authentication data to user equipment 400. At step S9080, service server 100 may receive the authentication data from user equipment 400 in response to the request. At step S9090, service server 100 may verify whether the received authentication data is matched with one stored in a memory in connection with the registered user. In the authentication procedure, service server 100 may request a voice confirmation from the registered user as the authentication data. That is, service server 100 may request the registered user to provide the authentication in a voice through telephonic communication. When service server 100 receives the voice confirmation, service server 100 may determine whether the received voice is identical to a voice stored in a database in connection with the registered user.

When the authentication data is not matched (No—S9090), service server 100 may transmit an authentication failure message to user equipment 400 at step S9100. When the authentication data is matched (Yes—S9090), service server 100 may transmit an abnormal event termination message indicating termination of the abnormal event to the associated organizations at step S9110.

As described, control server 100 may detect an abnormal event occurring in a target monitoring area based on a monitoring result from control system 200. For example, the abnormal event may be abrupt increase in a moving speed of user equipment 400 (e.g., registered user), sudden change in a moving direction of user equipment 400, moving out of a service area, or deviation from a predetermined route. Such detection may be performed by analyzing a monitoring result from control system 200. Hereinafter, such an operation will be described with reference to FIG. 10.

Figure 10:
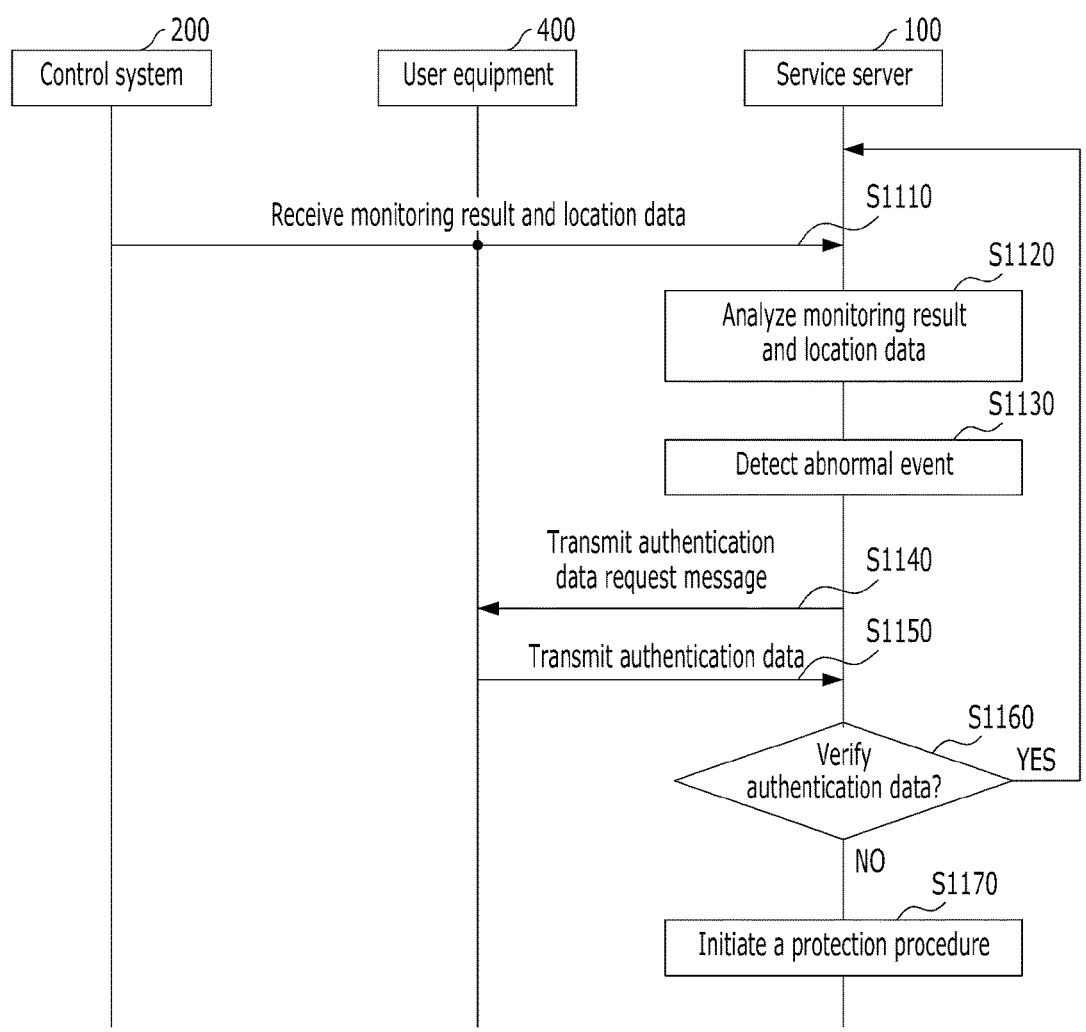
FIG. 10 illustrates an operation of detecting an abnormal event in accordance with at least one embodiment.

FIG. 10 illustrates an operation of detecting an abnormal event in accordance with at least one embodiment.

Referring to FIG. 10, service server 100 may receive a monitoring result from control system 200 and location data from user equipment 400 at step S1010. For example, after the interactive and targeted monitoring service is requested, control system 200 regularly provides a monitoring result of monitoring a target object (e.g., the registered user) to service server 100 and user equipment 400 provides location information thereof to service server 100. Beside the monitoring result and the location information, other information on a target object (e.g., user equipment 400) may be provided to control server 100. Such information may include an operation status, a battery status, and strength of cellular reception of user equipment 400.

At step S1020, service server 100 may analyze the monitoring result and the location information. The monitoring results may include the images of the registered user received from monitoring devices 301 to 303. For example, service server 100 may determine a moving speed and a moving direction of user equipment 400 based on the monitoring result and the location information. In addition, service server 100 may detect an event occurring around or at the registered user based on the monitoring result and the location data.

At step S1030, service server 100 may detect an abnormal event is occurring in association with the registered user based on the analysis result. For example, service server 100 may determine the abnormal event occurs when the target object moves outside of the service area, when the target object deviates from a designated route, when the target object stays still for a predetermined time period, when the target object makes a predetermined signal, when the target object is attacked by other objects (e.g., person or animal), when the target object falls down, when the target object starts running, when the target object is screaming, and so forth.

Such abnormal event may be detected through various methods, but the present invention is not limited to one specific method of detecting the abnormal event. For example, characteristics of the target object may be measured or estimated based on the monitoring results. Such characteristics may include a moving speed, a moving direction, a motion range, and a voice level. When the measured or estimated characteristics are higher than a predetermined threshold, service server 100 or control system 200 may determine that an abnormal event occurs.

At step S1040, service server 100 may transmit an authentication request message to user equipment 400 upon the detection of the abnormal event. For example, when service server 100 detects the abnormal event occurs in association with the registered user, service server 100 may generate the authentication request message and transmit the generated message to user equipment 400 for asking whether the detected abnormal event is really occurring in associated with the registered user.

At step S1050, service server 100 may receive authentication data from user equipment 400 in response to the authentication request message. For example, the authentication request message may initiate user equipment 400 to inquire the registered user to enter the authentication data for confirming whether the detected abnormal event is really occurring. In response to the inquiry, the registered user enters the requested authentication data to user equipment 400. The requested authentication data may include i) a motion input made by detecting a predetermined gesture of the registered user, ii) a voice input generated by detecting a predetermined voice command from the registered user, iii) a touch input made on a predetermined icon displayed within a predetermined graphic user interface on user equipment 400, and iv) an activation input made on a predetermined button or a key of user equipment 400.

At step S1060, service server 100 may determine whether the received authentication data is matched with authentication data stored in connection with information on the registered user, stored in a memory. When the authentication data is matched (Yes—S1060), service server 100 may continuously provide the interactive and targeted monitoring service on the target object. When the authentication data is not matched or user equipment 400 fails to transmit the authentication data (No—S1060), service server 100 may initiate a protection procedure at step S1070. That is, service server 100 may transmit an emergency alert message to the associated organizations and control predetermined electronic devices near the registered user to perform a predetermined operation. The emergency alert message may include the location data received from user equipment 400.

When user equipment 400 is unable to communicate with service server 100 through communication network 500, is experiencing a trouble, or turned off, service server 100 may directly send the alert message to the associated organizations without receiving the authentication data from user equipment 400.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

In the specification, user equipment may be referred to as at least one of a mobile station (MS), a mobile terminal (MT), a subscriber station (SS), a portable subscriber station (PSS), an access terminal (AT), Use equipment may include at least one or entire of functions of a MS, a MT, a SS, a PSS, and an AT. In addition, a base station (BS) may be referred to as an access point (AP), a radio access station (RAS), a node b (NodeB), an evolved NodeB (eNodeB), a base transceiver station (BTS), a mobile multihop relay (MMR)-BS. A base station may include at least one or entire of functions of an AP, a RAS, a NodeB, an eNodeB, a BTS, and a MMR-BS.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of providing an interactive and targeted monitoring service to user equipment by a service server that is coupled with a control system and a plurality of monitoring devices through a communication network, the method comprising:
   providing, by the service server, a target object recognition signal to the user equipment and a control signal in response to a service request message from the user equipment;
   requesting, by the service server, the control system to provide the interactive and target monitoring service on a target object recognized based on the target object recognition signal using the plurality of monitoring devices;
   performing, by the service server, a protection procedure in response to a protection request from at least one of the control system and the user equipment; and
   requesting, by the service server, the control system to terminate the interactive and targeted monitoring service in response to termination notification from the control system, wherein the target object recognition signal is generated based on information included in the service request message from the user equipment, and the user equipment performs at least one operation based on information included in the target object recognition signal, and wherein the target object recognition signal comprises information on at least one of a predetermined image pattern to be displayed on the user equipment, a predetermined control pattern for controlling at least one constituent element of the user equipment, and a predetermined gesture guidance for instructing the target object to make a predetermined gesture.

2. The method of claim 1, wherein the providing comprises:

receiving, by the service server, the service request message for the interactive and targeted monitoring service from the user equipment;

generating, by the service server, the target object recognition signal based on the_ information included in the received service request message; and transmitting, by the service server, the generated target object recognition signal to the user equipment and the control system through the communication network.

3. The method of claim 2, wherein the service request message comprises information on a location of the user equipment, a target object to monitor designated by the user equipment, a destination of the target object, a route to travel to the destination, and authentication data associated with the target object.

4. The method of claim 1, wherein the requesting of the interactive and target monitoring service comprises:

generating, by the service server, a monitoring request message to include the target object recognition signal; and transmitting, by the service server, the generated monitoring request message to the control system through the communication network.

5. The method of claim 4, wherein the target object recognition signal included in the monitoring request message comprises information on at least one of a predetermined image pattern, a predetermined control pattern, and a predetermined gesture for identifying the target object to monitor.

6. The method of claim 4, wherein the monitoring request message includes information on a location of the user equipment, a target object to monitor designated by the user equipment, a destination of the target object, a route to travel to the destination, and authentication data associated with the target object.

7. The method of claim 1, wherein the performing comprises:

receiving a protection request message from at least one of the user equipment and the control system when an abnormal event occurs in associated with the target object; and performing, as the protection procedure, a set of processes for protecting the target object from the abnormal event upon the receipt of the protection request.

8. The method of claim 7, wherein the set of processes comprises at least one of:

an operation of transmitting a notification message to designated persons and organizations for informing of the abnormal event;

an operation of transmitting a control signal to designated electronic devices to output a predetermined warning message; and an operation of transmitting a control signal to the user equipment to control at least one of constituent elements of the user equipment.

9. The method of claim 1, wherein the performing comprises:

transmitting an authentication request message to the user equipment upon receipt of a protection request message from at least one of the user equipment and the service server;

verifying an abnormal event occurring at the target object based on information included in a response message received from the user equipment in response to the authentication request message and based on whether the response message is received or not; and perform the protection procedure based on the verification result.

10. The method of claim 1, wherein the requesting of the termination comprises:

receiving a notification message for termination of an abnormal event from at least one of the user equipment and the control system; and transmitting a removal request message to the control system for removal of the target object recognition signal registered with the target object and the user equipment.

11. The method of claim 10, wherein the transmitting a removal request message comprises:

transmitting an authentication request message to the user equipment;

receiving a response message from the user equipment in response to the authentication request message;

determining whether authentication data included in the response message is matched with one stored in connection with the user equipment; and transmitting the removal request message to the control system only when the authentication data is matched with one stored in connection with the user equipment.

12. A method of providing an interactive and targeted monitoring service to user equipment by a control system that is coupled with a service server and a plurality of monitoring devices through a communication network, the method comprising:

receiving a monitoring request message with a target object recognition signal from the service server;

identifying the target object from unspecific objects in a service area based on information included in the target object recognition signal;

monitoring the identified target object as the interactive and monitoring service;

determining whether an abnormal event occurs in associated with the target object based on the monitoring result;

triggering a protection procedure upon the detection of the abnormal event; and informing the service server of termination of the abnormal event, wherein the user equipment performs at least one operation based on information included in the target object recognition signal, and wherein the target object recognition signal comprises information on at least one of a predetermined image pattern to be displayed on the user equipment, a predetermined control pattern for controlling at least one constituent element of the user equipment, and a predetermined gesture guidance for instructing the target object to make a predetermined gesture.

13. The method of claim 12, wherein the monitoring comprises:
controlling the plurality of monitoring devices to monitor the identified target object based on the monitoring request message and the identified target object.

14. The method of claim 12, wherein the monitoring comprises:
receiving a target object recognition signal from the service server; and
registering the received target object recognition signal with user equipment requesting the interactive and targeted monitoring service.

15. The method of claim 12, wherein the determining comprises:
estimating at least one of a location, a moving speed, a moving direction, a motion range, a sound level, and brightness of the target object based on the monitoring result; and
detecting the abnormal event when at least one of estimated values is greater than a predetermined threshold.

16. The method of claim 12, wherein the determining comprises:
determining that the abnormal event occurs at least one of when the target object moves outside of the service area, when the target object deviates from a designated route, when the target object stays still for a predetermined time period, when the target object makes a predetermined signal, when the target object is attacked by other objects, when the target object falls down, when the target object starts running, when the target object is screaming, when the target object becomes unavailable to monitor, and when an abnormal event signal is received from the registered user.

17. The method of claim 12, wherein the triggering comprises:
generating a protection request message upon detection of an abnormal event based on the monitoring result; and
transmitting the generated protection request message to the service server through a communication network.

18. The method of claim 12, wherein the informing comprises:
continuously monitoring the target object after triggering the protection procedure;
determining whether the abnormal event is terminated based on the monitoring result;
generating a notification message for informing the service server of termination of the abnormal event when the abnormal event is terminated; and
transmitting the notification message to the service server through a communication network.

19. The method of claim 18, comprising:
determining that the abnormal event is terminated at least one of when the target object comes back to the service area, when the target object comes back to a designated route, when the target object becomes available to monitor, and when an abnormal event termination signal is received from the registered user.

* * * * *